United States Patent [19]

Mizuno

[11] 4,040,097
[45] Aug. 2, 1977

[54] MAGNETIC CARD-READER WITH MOVABLE MAGNETIC HEAD

[75] Inventor: Mamoru Mizuno, Tokyo, Japan

[73] Assignee: Kabushiki Kaisha Sankyo Seiki Seisakusho, Japan

[21] Appl. No.: 641,990

[22] Filed: Dec. 18, 1975

[30] Foreign Application Priority Data

Jan. 20, 1975 Japan .................................. 50-9184
Jan. 22, 1975 Japan .................................. 50-9592
Jan. 22, 1975 Japan .................................. 50-9593

[51] Int. Cl.² ....................... G11B 25/04; G06K 7/08; G11B 21/02
[52] U.S. Cl. ................... 360/2; 235/61.11 D; 360/101; 360/107
[58] Field of Search .................. 235/61.11 D; 360/88, 360/101, 104, 105, 107, 109, 2

[56] References Cited

U.S. PATENT DOCUMENTS

| | | | |
|---|---|---|---|
| 3,571,799 | 3/1971 | Coker, Jr. et al. | 235/61.11 D |
| 3,603,944 | 9/1971 | Taplin | 235/61.11 D |
| 3,614,394 | 10/1971 | Bindshedler | 235/61.11 D |
| 3,706,860 | 12/1972 | Burbank | 360/88 |
| 3,731,061 | 5/1973 | Laybourn | 235/61.11 D |
| 3,914,789 | 10/1975 | Coker, Jr. et al. | 360/88 |

Primary Examiner—Daryl W. Cook
Attorney, Agent, or Firm—James C. Wray

[57] ABSTRACT

The present invention relates to a magnetic card reader having a motor driven magnetic head sliding on a stationary magnetic card. An error-checking function for the inserted magnetic card is provided. A control means is provided for setting the start of recording and reading out by the magnetic head at a specific distance from the end of said magnetic card. A position control precisely controls movement of the magnetic head along the magnetic stripe of the magnetic card. The magnetic head is supported by two mutually parallel leaf springs, which hold the head always perpendicular to the magnetic card. A motor governor circuit makes the magnetic head move at constant speed.

22 Claims, 12 Drawing Figures

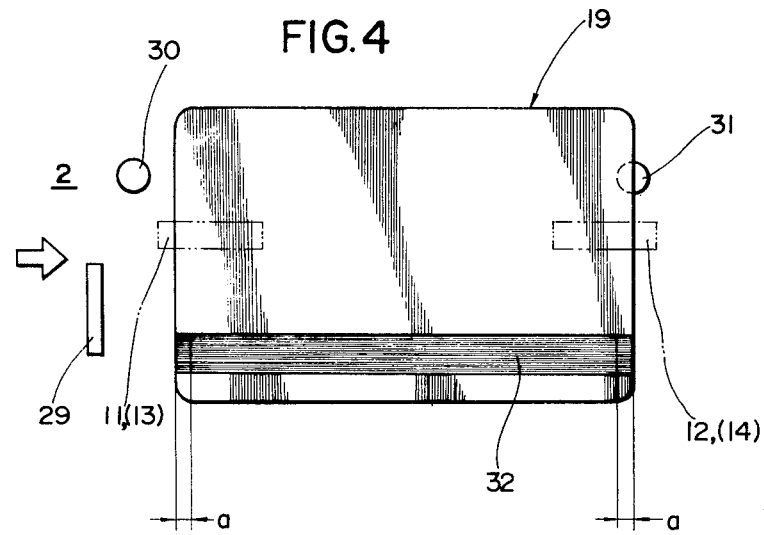
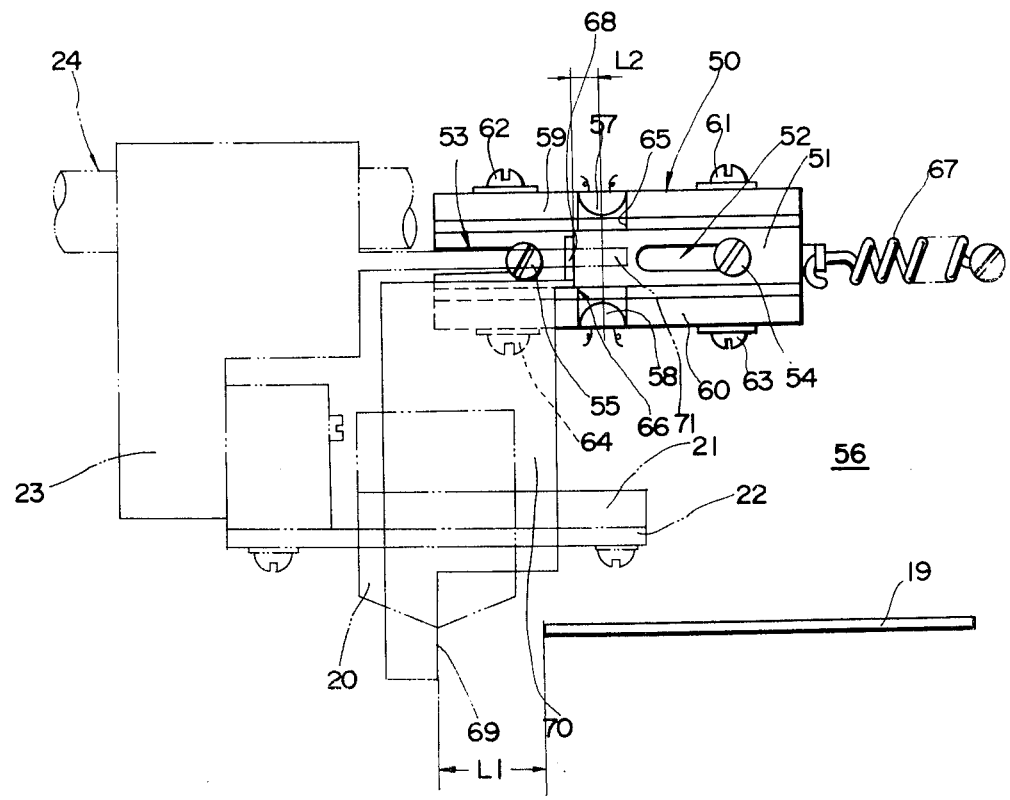

WIDTHWISE DIRECTION OF MAGNETIC CARD

MAGNETIC CARD-READER WITH MOVABLE MAGNETIC HEAD

BACKGROUND OF THE INVENTION

The present invention relates to a magnetic card reader with a movable magnetic head for recording data on and reading data out of a magnetic card.

In magnetic card readers with movable magnetic heads, the inserted magnetic card is conveyed on a carrier to a specified position, where it is stopped. The magnetic head is moved back and forth, in sliding contact with the magnetic stripe of the stopped magnetic card, thereby recording or reading-out information.

To avoid a false card other than the magnetic card being inserted, a card-intercept member like a shutter is installed in the path of the magnetic card. A prehead is installed around the entrance to the magnetic card path to examine the inserted magnetic card. Thus, two magnetic heads are needed: a main magnetic head for recording and reading out information, and a prehead for opening and closing a shutter and the like.

A magnetic card conveyed on the carrier is identified by a detection means such as a photo sensor and is stopped at a specific position. Thereby an error occurs within several millimeters from the specified stop position in the longitudinal direction of magnetic card. Ordinarily, the magnetic stripe of the magnetic card includes an area at a specific distance from the end of the magnetic stripe, where data area control is provided, that is, where no recording of data is done. Therefore, if variations happen in the magnetic card stopping position, it will be impossible to make uniform control of the magnetic head record or read-out starting position in accordance with the data area control value.

When in action, the magnetic head has to move precisely in sliding contact with the specified magnetic stripe. For this reason, the so-called "positioning" of the magnetic head is an essential requirement; if this positioning accuracy is low, it will be impossible either to make a reliable reading out of information from the magnetic stripe; or to record information at specified spots on the magnetic strip.

Another essential requirement for precise recording and reading out of information is that, when in action, the magnetic head must be pressed to the magnetic stripe of the magnetic card in perfectly perpendicular relationship.

Moreover, the magnetic head is interlocked with a motor for recording and reading out of information therefore unless the motor keeps its specified r.p.m., the moving speed of the magnetic head will vary. Thus for the purpose of reliable recording and reading out of information, the r.p.m. of the motor has to be controlled so that a specific speed of the magnetic head can be maintained.

SUMMARY OF THE INVENTION

The object of the present invention is to offer a magnetic card-reader with a movable magnetic head, characterized in that examining a magnetic card just as it is being inserted abolishes a need for a prehead in the magnetic card path and for controlling the opening and closing of a card-intercept member like a shutter. The function of the prehead is performed by a single magnetic head for recording and reading-out information.

Another object of the present invention is to offer a magnetic card-reader with a movable magnetic head in which, regardless of any error in the stopping position of a carried magnetic card, the starting position for the magnetic head to record and read out information from the magnetic stripe can be set at a specified distance from the end of the magnetic stripe in accordance with the data area control.

Still another object of the present invention is to offer a magnetic card-reader with a movable magnetic head which is equipped with a structurally simple, exact positioning mechanism for making the magnetic head move precisely in sliding contact with the magnetic stripe in the recording and reading-out of information.

Still another object of the present invention is to offer a magnetic card-reader with a moveable magnetic head which is equipped with a magnetic head-holding mechanism which at all the time presses the magnetic head perpendicularly on the magnetic card when the magnetic head slides in contact with the magnetic card.

Still another object of the present invention is to offer a magnetic card-reader with a movable magnetic head which is equipped with a motor-governor circuit for keeping constant r.p.m.'s of a motor which is interlocked with the magnetic head.

The other objects, features and benefits of the present invention will become apparent from the following description of the invention, referring to the attached drawings.

BRIEF DESCRIPTION OF THE DRAWINGS

FIG. 4 is a plan view of a magnetic card as carried and then stopped.

FIG. 5 is a front view of the data area control device.

DETAILED DESCRIPTION OF THE DRAWINGS

Figure 1:
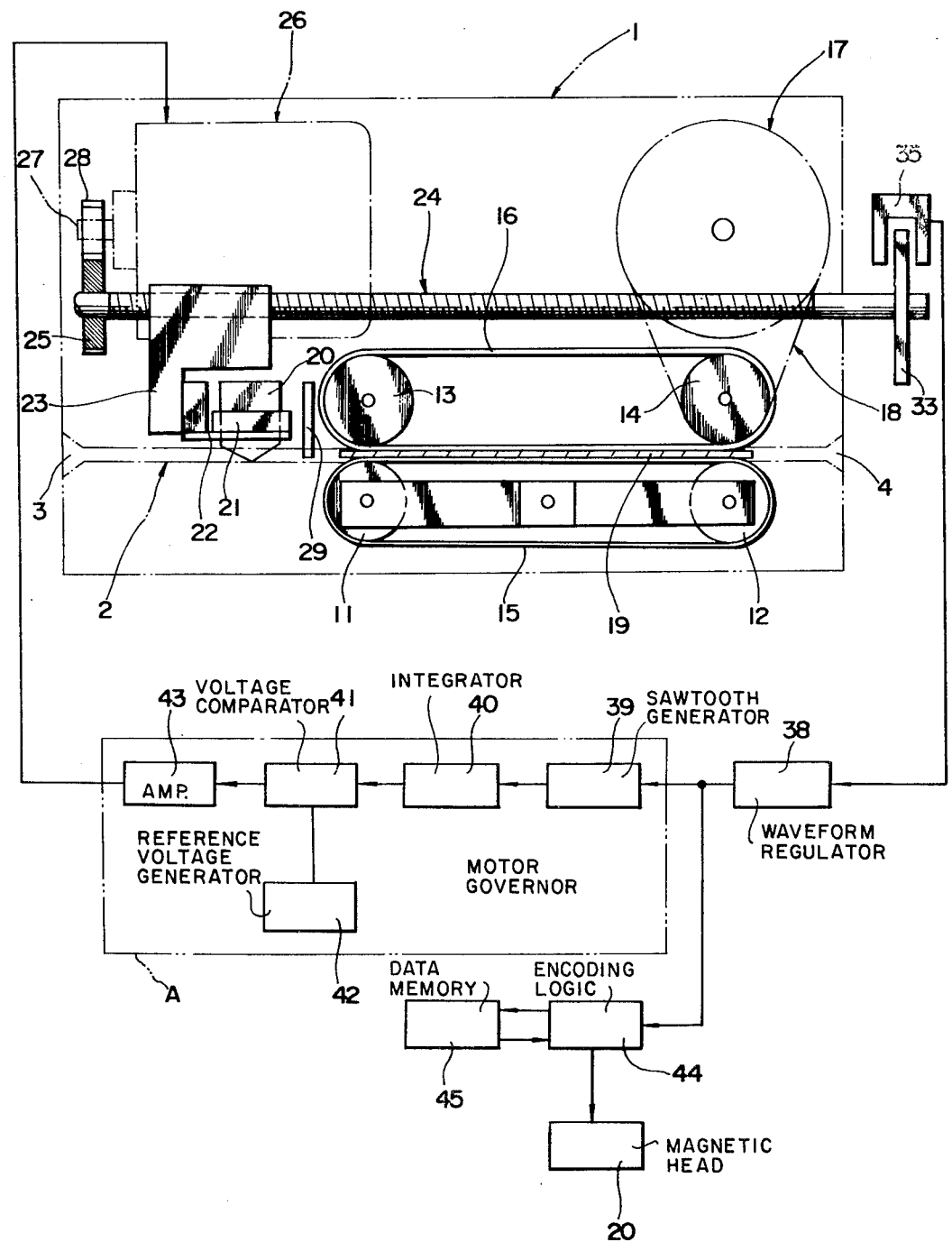
FIG. 1 shows a general scheme of a magnetic cardreader according to the present invention.

The whole structure of a magnetic card-reader according to the present invention is illustrated in FIg. 1. Within the magnetic card-reader 1, a card path 2 is formed. At respective ends of the card path 2 the card inlet 3 and the card outlet 4 open. Facing the card path 2 there are rotatably installed the top and bottom pulleys 11 and 12, opposite to which there are rotatably installed the opposite pulleys 13 and 14. Between pulleys 11 and 12 a conveyor belt 15 is stretched. A similar conveyor belt 16 is stretched between the pulleys 13 and 14. The pulley 14 is interlocked via drive belt 18 with a motor 17 to drive the card. A magnetic card, which has been introduced through the card inlet 3 into the card path 2, is held on the conveyor belts 15 and 16, is driven by the motor 17, and is carried to a specified position. FIG. 1 illustrates the magnetic card 19 as held on the belts 15 and 16.

The magnetic head 20 is fixed to a frame member 21, which is connected via leaf spring 22 to the head holder 23. This magnetic head-holding mechanism will later be described in detail. The head-holder 23 is screwed to a worm shaft 24 which is supported parallel to the card path 2. The head-holder 23, being guided by a positioning mechanism later to be described, is movable with the rotation of said worm shaft 24 in the longitudinal direction of said worm shaft 24. At the left end of said worm shaft 24 is integrally mounted a spur gear 25, which meshes with a pinion gear 28 fitted to the rotating shaft 27 of a motor 26 for moving the head.

In FIG. 1 the magnetic head 20 is at rest. A card-intercept member 29 like a shutter, which is controlled by this magnetic head 20 at rest, has its lower end located within the card path 2. The card-intercept member 29 is located deeper in card path 2 than the magnetic head 20 at rest and ahead of the pulleys 11 and 13. Said card-intercept member 29, being interlocked with an opening-closing device not shown, is vertically movable; and said opening-closing device is controlled by a control signal issued from the magnetic head 20 at rest. To the right of said card-intercept member 29 the photo-sensors 30 and 31 are installed along the card path 2. (See FIG. 4.)

The magnetic head 20 in the state of the magnetic card 19 being carried to the indicated position, being interlocked with the rotation of the worm shaft 24, moves to the right in FIG. 1. Information is recorded on the magnetic stripe 32 (FIG. 4) formed on the magnetic card 19, or information is read off magnetic stripe 32, in the course of this rightward movement of head 20. When magnetic head 20 finishes the recording or read-out action, the worm shaft 24 is reversed and the magnetic head 20 is returned to the position indicated in FIG. 1 and is stopped there.

Figure 2:
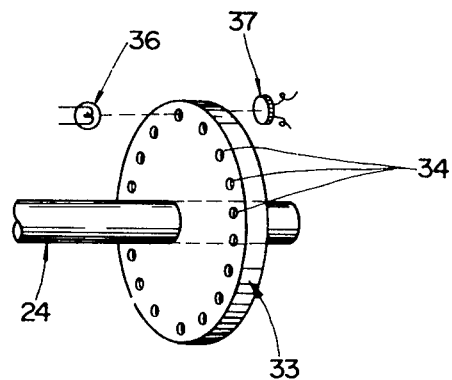
FIG. 2 is a diagram illustrating and the relation among the disc, the light-issuing element and the light-receiving element.

At the left end of said worm shaft 24 a disc 33 is attached. A plurality of windows or slits 34 open at equal intervals on a periphery of the disc. (See FIG. 2.) Straddling the slits (or windows) 34, a photo-coupler 35 provides a light-issuing element 36 and a light-receiving element 37 in opposition to each other. These elements constitute a means to detect the moving speed of the magnetic head. The photo-coupler 35 is connected to a waveform regulator 38.

In FIG. 1, 39 is a saw tooth wave generator circuit, 40 is an integration circuit, 41 is a voltage comparator, 42 is a reference voltage generator, 43 is a power amplifier, and elements 39 through 43 constitute a motor-governor r.p.m. control circuit A. 44 is an encoding logic, 45 is a data memory, and 20, as described above, is a magnetic head.

When the motor 26 runs for moving the head 20, and the worm shaft 24 rotates, a signal is issued from the photo-coupler 35. The signal, with its waveform regulated by the waveform regulator 38, goes into the motor-governor circuit A. Working through the saw tooth wave generator 39, the integration circuit 40, the voltage comparator 41 and the power amplifier 43, the signal serves to keep the r.p.m. of motor 26 constant.

When the magnetic head 20 is to record information on the magnetic stripe 32 of the magnetic card 19, the disc 33 rotates together with the rotation of the worm shaft 24. A signal issued from the photo-coupler 35 has its waveform regulated by the waveform regulator 38. The signal then goes as a clock pulse to the encoding logic 44, picks up data to be registered from the data memory 45, and via the magnetic head 20 registers the data at equal intervals on the magnetic stripe 32.

Figure 3:
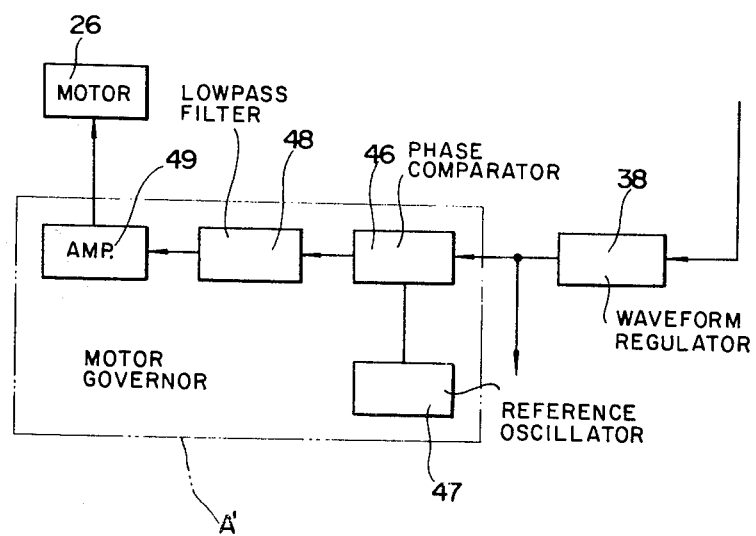
FIG. 3 shows a composition of the motor-governor circuit in another embodiment of the present invention.
Figure 6:
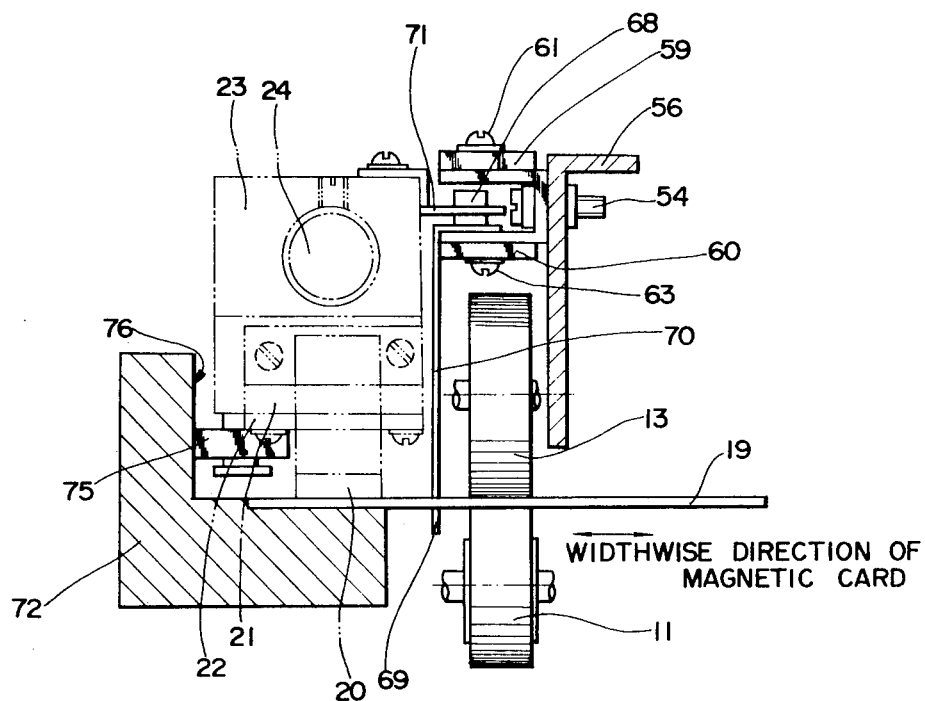
FIG. 6 is a right side view of the data area control device.

FIG. 3 illustrates another embodiment of the motor-governor circuit using a phase-fixing circuit. Motor-governor circuit A' consists of the phase comparator 46, the reference oscillator 47, the low-pass filter 48 and the amplifier 49. The motor-governor circuit A' is interposed between the waveform regulator 38 and the head-moving motor 26.

Referring to FIGS. 4 to 7, in accordance with the data area control, the data area control device uniformly sets the starting position for the magnetic head 20 to record or read out information from the magnetic stripe 32, at the specified distance $a$ from the end of the magnetic stripe. The magnetic stripe 32 of the magnetic card 19 is subject to the data area control, i.e., no recording of data is to take place in the area at specified distances $a$, $a$ from both ends.

The data area control device 50 for this purpose is located beyond the magnetic head 20, the head-holder 23 and the worm shaft 24. A slider 51 of channel-shaped profile has two long slits 52 and 53 formed on its side. The screws 54 and 55 inserted into these long slits 52 and 53 control movement of the slider 51 on the fixed member 56, which is fixed to the magnetic card-reader 1. To the top and bottom of the slider 51 are fixed by the screws 61, 62, 63 and 64 respectively the plate members 59 and 60 attached with the photo-sensors 57 and 58. The photo-sensors 57 and 58 oppose each other through the small holes 65 and 66 bored on the top and bottom of the slider 51. These photo-sensors 57 and 58 may be replaced by some mechanical means of detection like a micro-switch. The slider 51 is normally urged to the right in FIG. 5 by tension spring 67. Meanwhile the slider 51 is integrated with a card-end detect lever 70 having a contact piece 68 formed at its top end and a detecting piece 69 formed at its bottom end. To head-holder 23 is solidly attached an action piece 71, whose tip engages the contact piece 68 of said card-out detect lever 70 when the magnetic head 20 is at rest and thereby said action piece 71 comes between said photo-sensors 57 and 58.

The data area control device 50 functions as follows. When the magnetic head 20 is at rest as illustrated in FIG. 5, the slider 51 is moved left overcoming the force of a spring 67 by said action piece 71 which engages the contact piece 68. When the magnetic card 19, with its widthwise position controlled by the guide 72, is carried by the opposed rollers 11 and 13 and the card tip is detected by the photo-sensor 31, the card-carrying motor 17 stops upon a signal issued from the photo-sensor 31. Thereupon, the head-moving motor 26 begins to run, causing a rightward movement in FIG. 5 along the worm shaft 24 of the head holder 23. Thereby the slider 51 together with the magnetic head 20 moves a distance $L_1$ to the right. Upon movement of distance $L_1$, the detecting piece 69 of the card-end detect lever 70 contacts the end of the magnetic card 19 and the slider 51 stops. As the head-holder 23 moves farther right, the action piece 71 fixed to the head-holder 23 too moves right. When the distance of this movement amounts to $L_2$, a control signal is issued from the photosensors 57 and 58. Upon this control signal, the magnetic head 20 starts actions of data recording or reading out relative to the magnetic stripe 32 of the magnetic card 19. Thus the action starting point of the magnetic head 20 is invariably at the distance $L_2$ from the magnetic card end, and the action starting point is never affected by the distance $L_1$. This means that, in spite of any error in the stopping position of a carried magnetic card 19, the action starting point of the magnetic head 20 is always located at the distance $L_2$ from the magnetic card end. Thereby the movable distance of the slider 51 to be controlled by the length of the slits 52 and 53 must be greater than the maximum error in the stopping position of the magnetic card 19.

Figure 7:
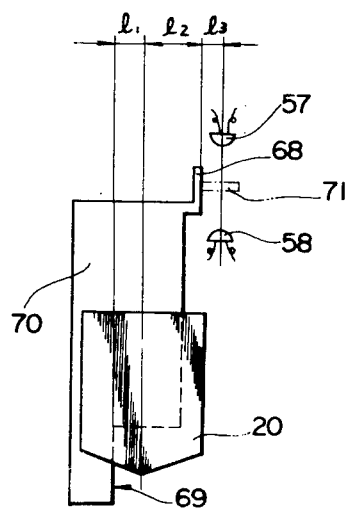
FIG. 7 shows a composition of the data area control device in still another embodiment of the present invention.

FIG. 7 illustrates another embodiment of said data area control device 50. In this embodiment the magnetic head 20 and the detecting piece 69 are separated by a distance $l_1$. Namely, when the detecting piece 69 contacts the magnetic card end not shown, the magnetic head 20 is $l_1$ ahead on the magnetic stripe of the magnetic card. Therefore, when the magnetic head 20 has moved a distance $l_1 + l_3$ from the end of the magnetic stripe, a control signal is issued from the photosensors 57 and 58, and the magnetic head 20 begins to act. Thereby $l_1 + l_2$ is the moved distance of the card-end detect lever 70. If the positional relation between the magnetic head 20 and the card-end detect lever 70 is reversed, it is understandable that the signal is issued from the photo-sensors 57 and 58 at a distance $l_3 - l_1$.

Referring to FIGS. 8 to 12, the magnetic head-positioning mechanism and the magnetic head-holding mechanism are described. The leaf springs 22a and 22b are fixed mutually parallel by the spacers 22c. First ends of springs 22a and 22b are connected to the frame member 21. Second ends of the springs are connected to the head-holder 23, respectively by the screws 73 and 74.

To the underside of the head-holder 23 is rotatably fitted a bearing 75 in vertical contact with a guide surface 76 of the guide 72. Guide surface 76 of the guide 72 is at right angles to the magnetic card 19. At the center of an insertion hole 77 bored in the headholder 23 is provided a female thread 78, on both sides of which are formed the guiding parts 79 and 80 with a flat cylindrical internal surface. The internal surface of the guiding parts 79 and 80 is normally in contact with the flat cylindrical outer thread surface of the worm gear 24. The female thread 78 meshes with the worm gear 24. A small screw 81 positions the female thread 78.

Figure 9:
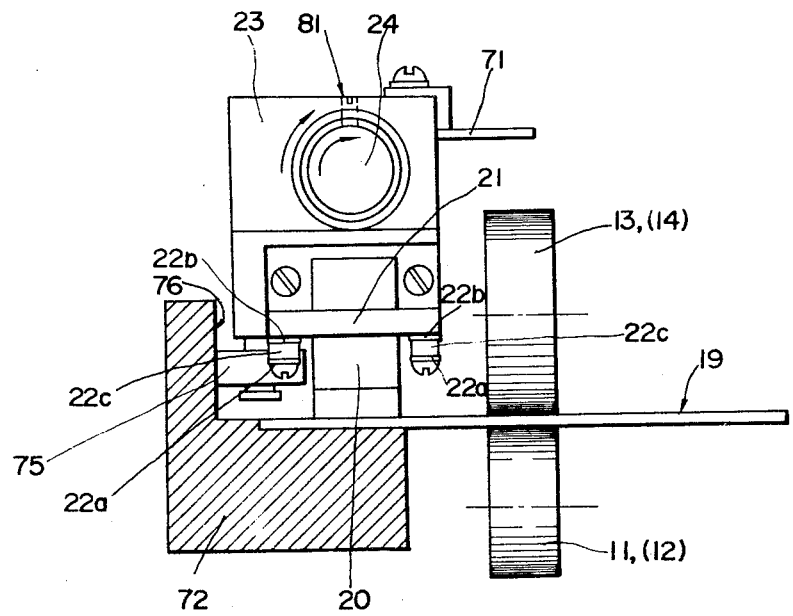
FIG. 9 is a diagram explaining the holding mechanism for the magnetic head.
Figure 10:
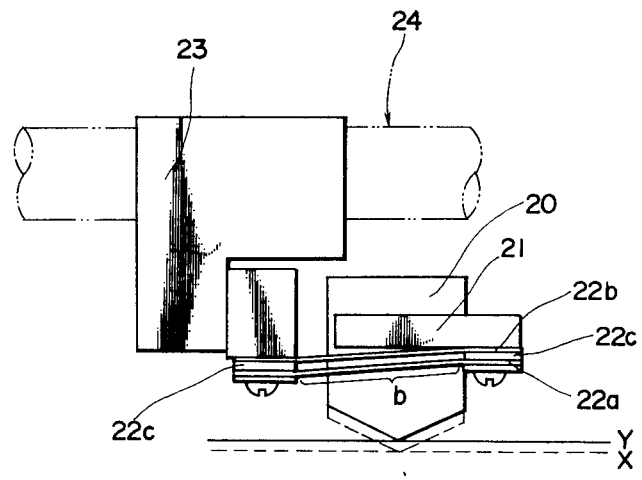
FIG. 10 is a diagram explaining the holding mechanism for magnetic head.

In FIG. 10 when the magnetic card-surface has risen to the line Y from the line X, the leaf springs 22a and 22b make a parallel crank movement, since the spacers 22c remain constant in thickness and the distance b between the spacers is invariable for each leaf spring. Thus the magnetic head 20 can be vertically raised to the level of the line Y. When for data recording and read-out by the magnetic head 20, the worm shaft 24 is turned clockwise as indicated in FIG. 9, the head-holder 23 moves to the right in FIG. 8, while at the same time a clockwise moment develops around the worm shaft 24. On account of this moment, the bearing 75, pressed to the guide surface 76, turns and moves. The same effect will be achieved even if a member with a low frictional resistance to slipping is employed instead of the bearing 75.

Figure 8:
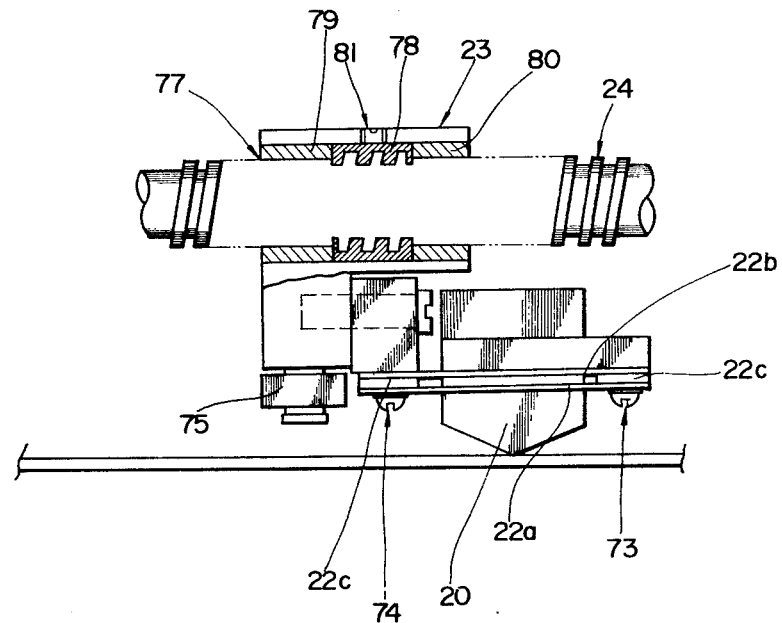
FIG. 8 is a fragmentary sectional view of the head holder.

When the magnetic head 20 moves to the left in FIG. 8, a moment developed in opposite direction renders the magnetic head 20 unstable, but this has nothing to do with the essential action of the magnetic card-reader.

Figure 11:
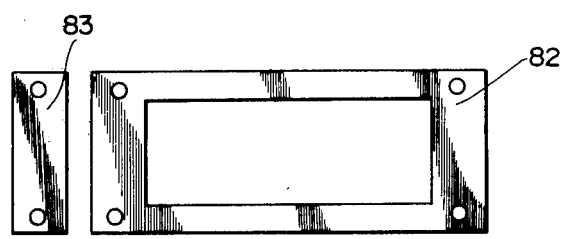
FIG. 11 is a plan view of leaf spring in still another embodiment of the present invention.
Figure 12:
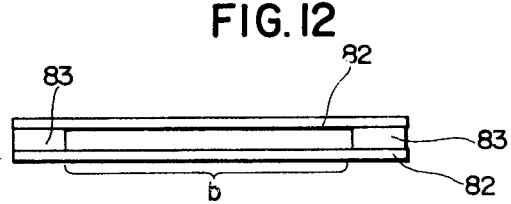
FIG. 12 is a side view of an assembled leaf spring in FIG. 11.

FIG. 11 illustrates leaf springs 22a and 22b of other profile, in which a spacer 83 of the same thickness is inserted between two leaf springs 82 squarely hollowed at the center. The side view is shown in FIG. 12. The functional effect is the same as illustrated in the case of the above-mentioned leaf springs 22a and 22b, but an additional effect of reducing the number of parts and simplifying the assemblage is obtained.

The operation of the magnetic card-reader 1 is as follows. Now suppose as shown in FIG. 1 the magnetic head 20 is at rest; the card-intercept member 29 is in the magnetic card path 2; and no magnetic card 19 is present in the magnetic card-reader 1. In this state a magnetic card 19 with card-identification data carried at the tip of the magnetic strip 32 is introduced into the card path 2 from the card inlet 3. Then the magnetic head at rest will read said card-identification data provided at the tip of the magnetic stripe 32. If the card is identified as true, the open-close device not shown will act to open the card-intercept member 29. If the card is identified as false, the card-intercept member 29 will remain closed and the card 19 will be intercepted.

When the card-intercept member 29 is open, the card 19 goes deeper, and its tip is detected by the photo-sensor 30. Upon a signal issued from sensor 30, the card-carrying motor 17 begins to run. Thereupon the card 19 held on the conveyor belts 15 and 16 is carried to the right in FIG. 1. When the tip of card 19 is detected by photo-sensor 31, a signal issues from the sensor 31 to stop motor 17. Thus the magnetic card 19 is stopped approximately at a specified position.

With stopping of the motor 17, the head-moving motor 26 begins to run, and together with the rotation of the worm shaft 24 the head-holder 23 begins to move to the left in FIG. 1. The data control device 50 acts to cause the magnetic head 20 to start functioning invariably at a specified distance from the end of magnetic stripe, regardless of variance in the stop position of the magnetic card 19. When the magnetic head 20 records, the encoding logic 44 and the data memory 45 act. While the worm shaft 24 is in rotation, the motor-governor circuit A or A' acts, and thus the head-moving motor 26 runs at a constant speed. While the magnetic head 20 is in motion, under the action of said positioning mechanism and said holding mechanism of the magnetic head, the exchange of information can take place reliably.

After the magnetic head 20 has moved from one end to the other end of the magnetic stripe 32, a limit switch not shown acts, and upon a signal for reverse motion issued therefrom the head-moving motor 26 runs in reverse direction. As a result, the magnetic head 20 returns to the original rest position.

The above is a description to a certain detail of the most desirable embodiment of the present invention, but the parts in desirable embodiments may be variously changed without departing from the spirit and claims later stated of the present invention.

I claim:

1. A magnetic card-reader with a movable magnetic head comprising head driving means to move a magnetic head along a card path, card moving means to carry to a specified position a magnetic card introduced in the card path, speed detection means adjacent the head driving means to detect moving speed of the magnetic head, data area control means for controlling starting of head magnetic operations, positioning means to position the magnetic head, and a means connected to the mounting means to hold the magnetic head in vertical position.

2. A magnetic card-reader of claim 1, characterized in that the card moving means to carry the card comprises parallel belts driven by pulleys and a card driving motor.

3. A magnetic card-reader of claim 1, in which the driving means is a motor and further comprising a motor-governor connected between the motor and the detecting means which detects the moving speed of magnetic head for controlling speed of the motor moving the magnetic head.

4. A magnetic card-reader of claim 1, which is equipped with a card-intercept means and control means connected to the intercept and head means for controlling the intercept means by the magnetic head at rest.

5. The speed detecting means for detecting the moving speed of magnetic head in the magnetic card-reader of claim 1, wherein the driving means comprises a worm shaft parallel to the card path and rotatably supported, a head holder supporting the magnetic head and screwed to said worm shaft, and a head-moving motor which drives said worm shaft, and wherein the speed detecting means comprises a disc with a plurality of openings provided at equal intervals along its periphery and rotatable together with said worm shaft, and a set of light-issuing and light-receiving elements installed on opposite sides of said openings in said disc.

6. The magnetic card-reader of claim 1 which comprises, between said speed detecting means to detect the moving speed of magnetic head and said head driving means for moving the magnetic head, a governor circuit consisting of a saw tooth wave generator circuit connected to the speed detecting means, an integration circuit, a voltage comparator, a reference voltage generator and a power amplifier for supplying power to the head-driving means.

7. A magnetic card-reader of claim 1, which comprises, between said speed detecting means to detect the moving speed of magnetic head and said head driving means for moving the magnetic head, a governor circuit consisting of a phase comparator, a reference oscillator, a lowpass filter and an amplifier for supplying power to the driving means.

8. A magnetic card-reader of claim 1 further comprising card-intercept means for intercepting cards, the intercept means being connected to the magnetic head and being controllable by the magnetic head at rest, for going into or out of the card path to intercept or pass cards selectively according to sensing by the magnetic head.

9. A magnetic card-reader of claim 1, wherein the data area control means comprises a slider connected for sliding through a long slit to a fixed member; a spring connected to the slider and a fixed member to urge said slider in one direction; a card end detect lever connected to the slider with a card-end detecting piece at its bottom end and at its top end with a contact piece, which engages an action piece movable together with the magnetic head, and a card edge detection means attached to said slider.

10. A magnetic card-reader of claim 1, wherein the driving means comprises a head holder screwed to a worm shaft, wherein the positioning means comprises a positioning member attached to said head holder which is urged in one direction by the moment developed through rotation of said worm shaft, and a guide in contact with which said positioning member moves.

11. The magnetic card-reader of claim 1 further comprising a head holder connected to the driving means, and wherein the means to hold comprises two mutually parallel leaf springs with spacers provided between them mounted between head holder and the magnetic head.

12. A magnetic card-reader with a movable magnetic head of claim 1, further comprising a head holder mounted between the driving means, wherein a head holder comprises a female thread formed at the center of an insertion hole and guides formed on both sides of said female thread and wherein the driving means comprises a screw in the hole connected to the thread and contacting the guides, and motor means connected to the screw for turning the screw.

13. The method for reading and recording information on a magnetic strip of a card comprising moving a card to a position on a card path, moving a magnetic head along the card, moving a card edge detector along the card, moving a card edge detector with the head, permitting the card edge detector to slip relative to the head for a predetermined distance, and beginning magnetic data flow operation of the head upon a precise predetermined relative position of the head and edge detector.

14. The method of claim 13 wherein the moving a card comprises moving a card adjacent the head and further comprising sensing identification of the card with the head, admitting cards of correct identification and separating cards of incorrect identification.

15. The method of claim 13 further comprising moving the head precisely perpendicularly to the card upon contacting the card.

16. The method of claim 13 wherein the head moving step comprises measuring speed of head moving apparatus and controlling constant speed according to measured speed.

17. The method of claim 16 wherein the measuring step comprises interrupting light rays with a perforated disc rotating with a head drive, forming and sensing pulses and further comprising flowing data between the head and the strip in timed relationship to the pulses.

18. The method of claim 13 wherein the edge detector moving comprises moving a slider and an action piece with the head until an edge of a card is detected, stopping the slider upon detecting the edge, continuing to move the action piece with the head, and creating a signal when the action piece has moved a predetermined distance with respect to the slider.

19. The method of claim 18 wherein the signal creating comprises unblocking a light path to a photoelectric detector with the action piece.

20. The method for reading and recording information on a magnetic strip of a magnetic card comprising moving a card along a magnetic head to a position in a card path, sensing identification on the card, stopping the card short of the position upon incorrect identification, stopping the card at the position upon correct identification, and moving the same head along the card to transfer magnetic information when the card is stopped at the position.

21. The method of claim 20, further comprising starting transferring of magnetic information when the head has moved a predetermined distance from an edge of the card.

22. The method of claim 20 comprising sensing an edge of the card, moving the head a predetermined distance from the edge and beginning the transfer.

* * * * *